(12) United States Patent
Jen et al.

(10) Patent No.: US 11,619,822 B2
(45) Date of Patent: Apr. 4, 2023

(54) HEAD MOUNTED DEVICE WITH ADJUSTABLE VERTICAL AND HORIZONTAL HEADBANDS

(71) Applicant: Wistron Corp., New Taipei (TW)

(72) Inventors: Tsu Yin Jen, New Taipei (TW); Pei Hsin Huang, New Taipei (TW); Lee Hua Yu, New Taipei (TW)

(73) Assignee: WISTRON CORP., New Taipei (TW)

( * ) Notice: Subject to any disclaimer, the term of this patent is extended or adjusted under 35 U.S.C. 154(b) by 155 days.

(21) Appl. No.: 16/858,469

(22) Filed: Apr. 24, 2020

(65) Prior Publication Data

US 2021/0149205 A1 May 20, 2021

(30) Foreign Application Priority Data

Nov. 19, 2019 (TW) .................................. 108141865

(51) Int. Cl.
*G02B 27/01* (2006.01)
*G02B 7/00* (2021.01)

(52) U.S. Cl.
CPC ......... *G02B 27/0176* (2013.01); *G02B 7/002* (2013.01); *G02B 2027/0154* (2013.01)

(58) Field of Classification Search
CPC ............ G02B 27/0149; G02B 27/0176; G02B 2027/0154; G02B 2027/0169; A61B 2090/502; B63C 2011/128; A42B 3/324
See application file for complete search history.

(56) References Cited

U.S. PATENT DOCUMENTS

| | | | |
|---|---|---|---|
| 2010/0095438 A1* | 4/2010 | Moelker | A42B 1/22 2/418 |
| 2011/0047679 A1* | 3/2011 | Rogers | A42B 3/324 2/418 |
| 2011/0265254 A1* | 11/2011 | Ma | A42B 3/145 2/420 |
| 2016/0054570 A1* | 2/2016 | Bosveld | G02B 27/0176 2/209.3 |
| 2019/0243414 A1* | 8/2019 | Bae | G06F 3/011 |
| 2020/0073130 A1* | 3/2020 | Wang | G02B 27/0176 |
| 2021/0080996 A1* | 3/2021 | Hudman | G06F 1/1679 |

FOREIGN PATENT DOCUMENTS

| | | |
|---|---|---|
| CN | 101919782 A | 12/2010 |
| CN | 103402383 B | 12/2015 |
| TW | I672104 B | 9/2019 |

\* cited by examiner

*Primary Examiner* — William Boddie
*Assistant Examiner* — Bipin Gyawali

(57) ABSTRACT

A head-mounted device is provided. The head-mounted device includes a longitudinal headband, a horizontal headband unit and a headband adjustment mechanism. The headband adjustment mechanism is connected to the longitudinal headband and the horizontal headband unit. In a first configuration, the headband adjustment mechanism is adapted to adjust the tightness of the horizontal headband unit. In a second configuration, the headband adjustment mechanism is adapted to adjust the tightness of the longitudinal headband.

14 Claims, 19 Drawing Sheets

HEAD MOUNTED DEVICE WITH ADJUSTABLE VERTICAL AND HORIZONTAL HEADBANDS

CROSS REFERENCE TO RELATED APPLICATIONS

This Application claims priority of Taiwan Patent Application No. 108141865, filed on Nov. 19, 2019, the entirety of which is incorporated by reference herein.

BACKGROUND OF THE INVENTION

Field of the Invention

The present invention relates to a head-mounted device, and in particular to a head-mounted device capable to adjust the tightness of the headband thereof.

Description of the Related Art

A conventional head-mounted device includes a horizontal headband. The user can adjust the tightness of the horizontal headband to make himself comfortable. However, if the head-mounted device (such as a head-mounted display device) becomes too heavy, the horizontal headband will no longer be able to support the entire weight of the head-mounted device. A longitudinal headband is therefore needed in the head-mounted device to share the weight of the head-mounted device. Conventionally, the tightness of the horizontal headband is adjusted by the horizontal adjustment mechanism, the tightness of the longitudinal headband is adjusted by the longitudinal adjustment mechanism, and the location of the horizontal adjustment mechanism differs from the location of the longitudinal adjustment mechanism on the head-mounted device. However, the user who wears the head-mounted device cannot see the horizontal adjustment mechanism and the longitudinal adjustment mechanism, and the conventional design can be inconvenient.

BRIEF SUMMARY OF THE INVENTION

In one embodiment, a head-mounted device is provided. The head-mounted device includes a longitudinal headband, a horizontal headband unit and a headband adjustment mechanism. The headband adjustment mechanism is connected to the longitudinal headband and the horizontal headband unit. In a first configuration, the headband adjustment mechanism is adapted to adjust the tightness of the horizontal headband unit. In a second configuration, the headband adjustment mechanism is adapted to adjust the tightness of the longitudinal headband.

In one embodiment, the horizontal headband unit comprises a first horizontal headband and a second horizontal headband, the headband adjustment mechanism comprises a horizontal adjustment unit, a longitudinal adjustment unit and a knob unit, the horizontal adjustment unit is connected to the first horizontal headband and the second horizontal headband, the longitudinal adjustment unit is connected to the longitudinal headband, wherein the knob unit is selectively connected to the horizontal adjustment unit and the longitudinal adjustment unit, or is connected to the horizontal adjustment unit and the longitudinal adjustment unit simultaneously, wherein the position of the first horizontal headband relative to the second horizontal headband and the position of the longitudinal headband relative to the longitudinal adjustment unit can be modified using the knob unit, and the knob unit has only one rotation axis.

In one embodiment, the headband adjustment mechanism further comprises a bracket, at least a portion of the horizontal adjustment unit is disposed on one side of the bracket, and the longitudinal adjustment unit is disposed on the other side of the bracket.

In one embodiment, the horizontal adjustment unit comprises a first gear, a first restriction wheel, and a transmission member, the transmission member is connected to the knob unit, the transmission member is connected to the first restriction wheel, the first gear is affixed to the first restriction wheel, the first horizontal headband comprises a first rack, the second horizontal headband comprises a second rack, the first gear meshes with the first rack and the second rack, the bracket comprises a ratchet ring, and the first restriction wheel is adapted to be connected to the ratchet ring.

In one embodiment, the first restriction wheel comprises a restriction wheel base and a horizontal restriction member, the horizontal restriction member is flexibly connected to the restriction wheel base, a first slot is formed on the horizontal restriction member, a second slot is formed on the restriction wheel base, the transmission member comprises a first post and a second post, the first post is connected to the first slot, the second post is connected to the second slot, and the horizontal restriction member is adapted to be wedged into the ratchet ring.

In one embodiment, the horizontal restriction member comprises a restriction ratchet, the first slot comprises a first slot end and a second slot end, and when the first post is in the first slot end, the restriction ratchet is wedged into the ratchet ring, and when the first post is in the second slot end, the restriction ratchet becomes separated from the ratchet ring.

In one embodiment, the longitudinal adjustment unit comprises a longitudinal restriction member, a second gear, and a second restriction wheel, the longitudinal restriction member is disposed on the bracket, the second gear is affixed to the second restriction wheel, the longitudinal headband comprises a third rack, the second gear meshes with the third rack, and the longitudinal restriction member restricts the second restriction wheel.

In one embodiment, the knob unit comprises a horizontal adjustment knob and a longitudinal adjustment knob, the horizontal adjustment knob is connected to the horizontal adjustment unit, the position of the first horizontal headband relative to the second horizontal headband is modified by rotating the horizontal adjustment knob, the longitudinal adjustment knob is connected to the longitudinal adjustment unit, the position of the longitudinal headband relative to the longitudinal adjustment unit is modified by rotating the longitudinal adjustment knob, and the rotation axis of the horizontal adjustment knob is collinear with the rotation axis of the longitudinal adjustment knob.

In one embodiment, the second gear comprises a gear wedging portion, the longitudinal adjustment knob comprises a first knob wedging portion, and the first knob wedging portion is wedged into the gear wedging portion.

In one embodiment, the longitudinal adjustment knob is disposed between the longitudinal adjustment unit and the horizontal adjustment knob, the longitudinal adjustment knob comprises a second knob wedging portion, the horizontal adjustment knob comprises a third knob wedging portion, wherein in the first configuration, the second knob wedging portion becomes separated from the third knob wedging portion, the horizontal adjustment knob is adapted to rotate the first gear independently, and the longitudinal adjustment knob is adapted to rotate the second gear independently, wherein in the second configuration, the second knob wedging portion is wedged into the third knob wedging portion, and the horizontal adjustment knob and the longitudinal adjustment knob rotate the first gear and the second gear simultaneously.

In one embodiment, the second restriction wheel comprises a restriction wheel wedging portion. The knob unit comprises a first clutch member, a second clutch member, a wedging ring, an inner button, an outer button, and a major knob. The first clutch member is affixed to the transmission member. The second clutch member is affixed to the inner button. The outer button is affixed to the wedging ring. In the first configuration, the major knob is connected to the inner button and the second clutch member is connected to the first clutch member to rotate the first gear. In the second configuration, the major knob is connected to the outer button and the wedging ring is connected to the restriction wheel wedging portion and rotates the second gear.

In one embodiment, the knob unit comprises an inner spring and an outer spring. One end of the inner spring abuts the major knob and the other end of the inner spring abuts the inner button. One end of the outer spring abuts the major knob and the other end of the outer spring abuts the outer button. The inner button comprises an inner button hook. The outer button comprises an outer button hook. When the knob unit is switched from the second configuration to the first configuration, the inner button hook pushes the outer button hook, and the outer spring moves the outer button. When the knob unit is switched from the first configuration to the second configuration, the outer button hook pushes the inner button hook, and the inner spring moves the inner button.

In one embodiment, the second restriction wheel comprises a restriction wheel wedging portion. The knob unit comprises a first clutch member, a second clutch member, an inner button, an outer button, and a major knob. The first clutch member is affixed to the transmission member. The second clutch member is affixed to the inner button. In the first configuration, the major knob is connected to the inner button and the second clutch member is connected to the first clutch member to rotate the first gear. In the second configuration, the major knob is connected to the outer button and the outer button is connected to the restriction wheel wedging portion, rotating the second gear.

In one embodiment, the knob unit comprises a slider, and the slider comprises a first slider-inclined surface and a second slider-inclined surface. The inner button comprises an inner button abutting portion. The outer button comprises an outer button abutting portion. When the knob unit is switched from the second configuration to the first configuration, the inner button abutting portion pushes the first slider-inclined surface to move the slider, and the second slider-inclined surface pushes the outer button abutting portion to move the outer button. When the knob unit is switched from the first configuration to the second configuration, the outer button abutting portion pushes the second slider-inclined surface to move the slider, and the first slider-inclined surface pushes the inner button abutting portion to move the inner button.

In one embodiment, a head-mounted device is provided. The head-mounted device includes a first horizontal headband, a second horizontal headband, a longitudinal headband and a headband adjustment mechanism. The headband adjustment mechanism includes a horizontal adjustment unit, a longitudinal adjustment unit and a knob unit. The horizontal adjustment unit is connected to the first horizontal headband and the second horizontal headband. The longitudinal adjustment unit is connected to the longitudinal headband. The knob unit is selectively connected to the horizontal adjustment unit and the longitudinal adjustment unit, or is connected to the horizontal adjustment unit and the longitudinal adjustment unit simultaneously, wherein the position of the first horizontal headband relative to the second horizontal headband and the position of the longitudinal headband relative to the longitudinal adjustment unit can be modified using the knob unit, wherein the knob unit has only one rotation axis.

In the embodiment of the invention, the tightness of the first horizontal headband, the second horizontal headband and the longitudinal headband can be adjusted by the knob unit with only one rotation axis. The user can adjust the tightness of the headbands easily. Additionally, in the embodiment of the invention, the tightness of the first horizontal headband, the second horizontal headband and the longitudinal headband can be adjusted simultaneously, and it is convenient to user for adjusting the tightness of the headbands.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
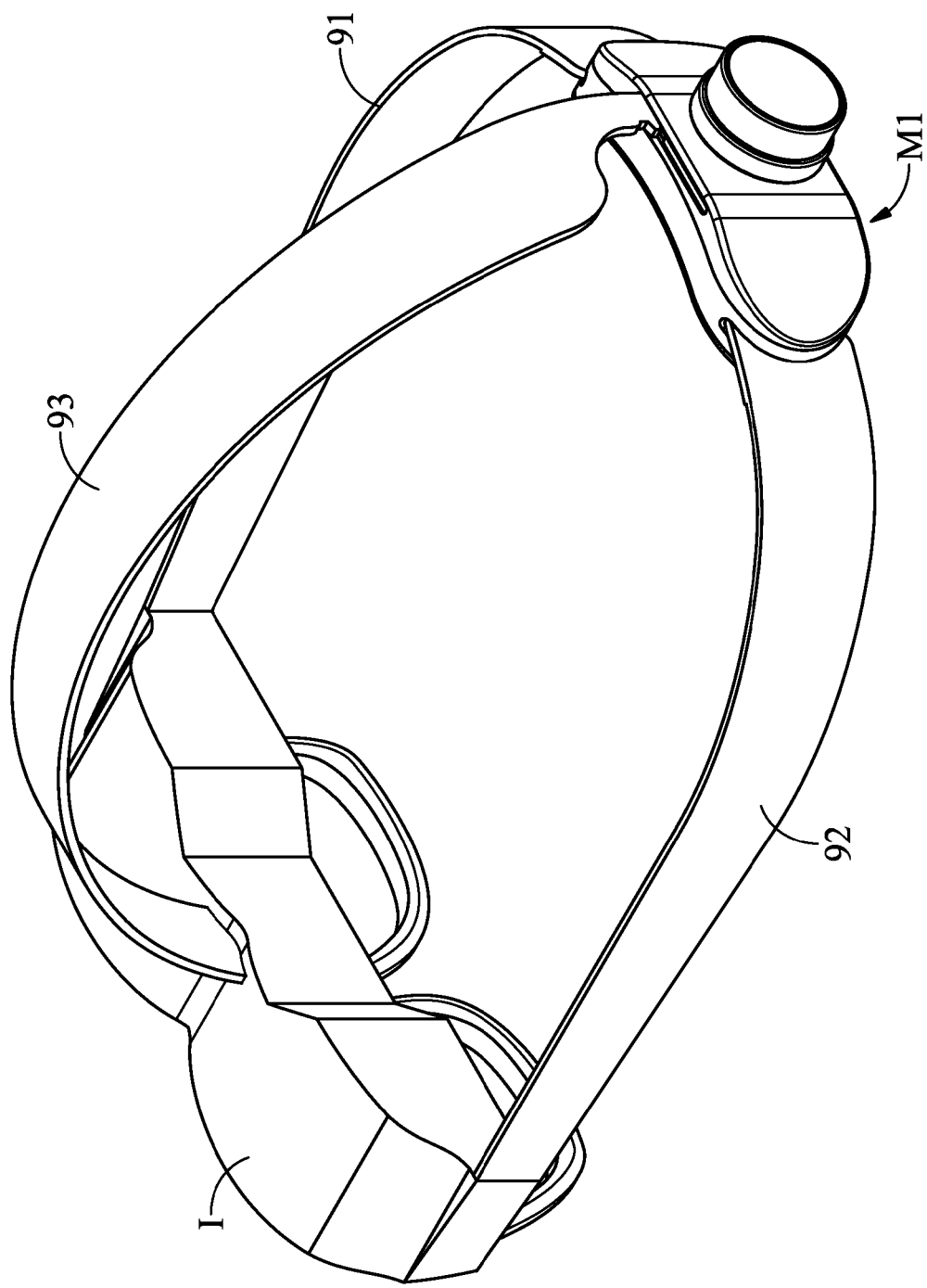
FIG. 1 shows a head-mounted device of the first embodiment of the invention.

FIG. 1 shows a head-mounted device of the first embodiment of the invention. With reference to FIG. 1, the head-mounted device D includes a video unit 1, a horizontal headband unit (including a first horizontal headband 91 and a second horizontal headband 92), a longitudinal headband 93 and a headband adjustment mechanism M1. In a first configuration, the headband adjustment mechanism M1 is adapted to adjust the tightness of the horizontal headband unit. In a second configuration, the headband adjustment mechanism M1 is adapted to adjust the tightness of the longitudinal headband.

Figure 2:
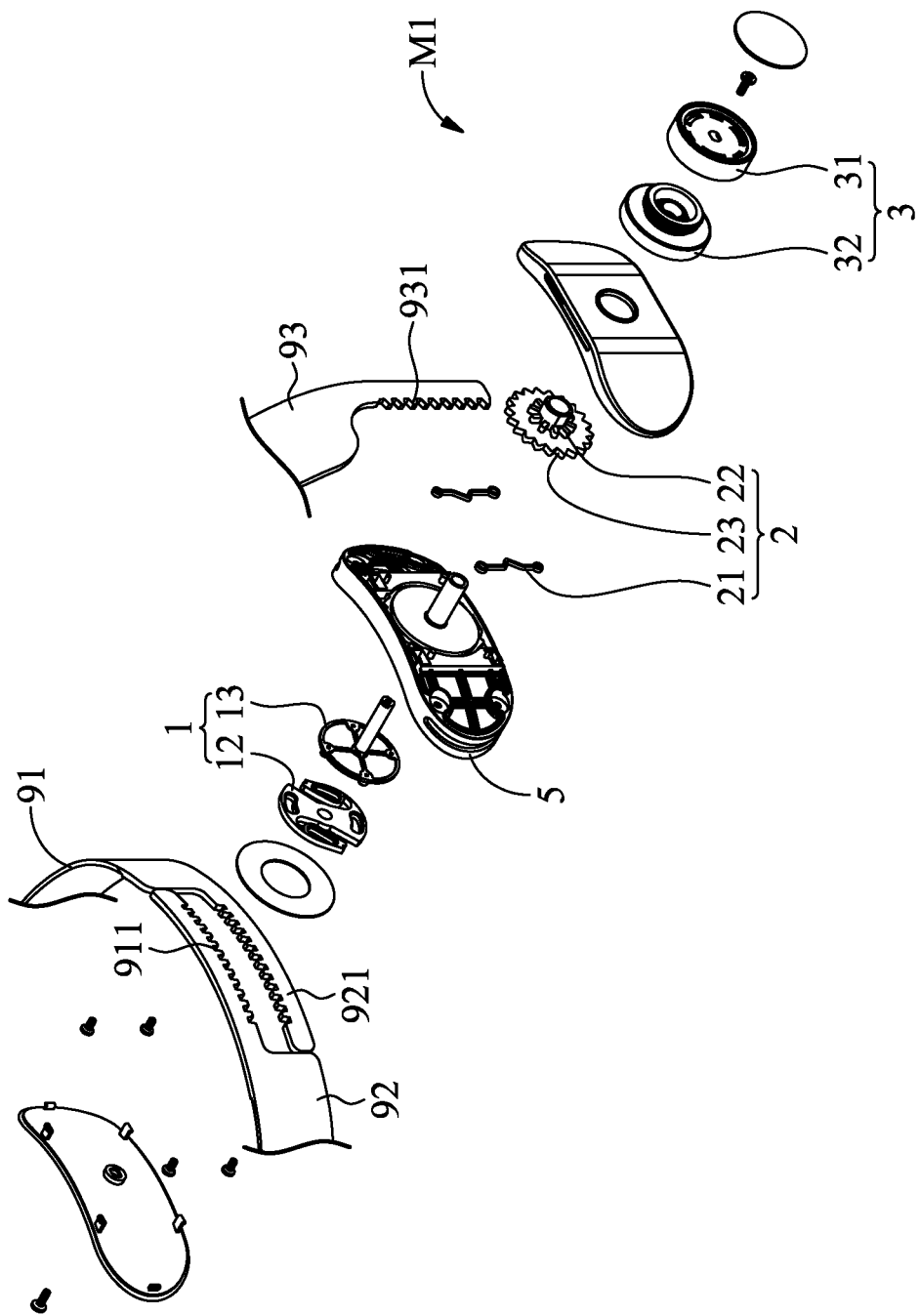
FIG. 2 is an exploded view of the headband adjustment mechanism of the first embodiment of the invention.

FIG. 2 is an exploded view of the headband adjustment mechanism M1 of the first embodiment of the invention. With reference to FIG. 2, the headband adjustment mechanism M1 comprises a horizontal adjustment unit 1, a longitudinal adjustment unit 2 and a knob unit 3. The horizontal adjustment unit 1 is connected to the first horizontal headband 91 and the second horizontal headband 92. The longitudinal adjustment unit 2 is connected to the longitudinal headband 93. The knob unit 3 is selectively connected to the horizontal adjustment unit 1 and the longitudinal adjustment unit 2, or is connected to the horizontal adjustment unit 1 and the longitudinal adjustment unit 2 simultaneously. The position of the first horizontal headband 91 relative to the second horizontal headband 92 and the position of the longitudinal headband 93 relative to the longitudinal adjustment unit 2 can be modified using the knob unit 3. The knob unit 3 has only one rotation axis (in other words, the knob unit 3 is rotated around only one rotation axis).

With reference to FIG. 2, in one embodiment, the headband adjustment mechanism M1 further comprises a bracket 5. At least a portion of the horizontal adjustment unit 1 is disposed on one side of the bracket 5, and the longitudinal adjustment unit 2 is disposed on the other side of the bracket 5.

Figure 3A:
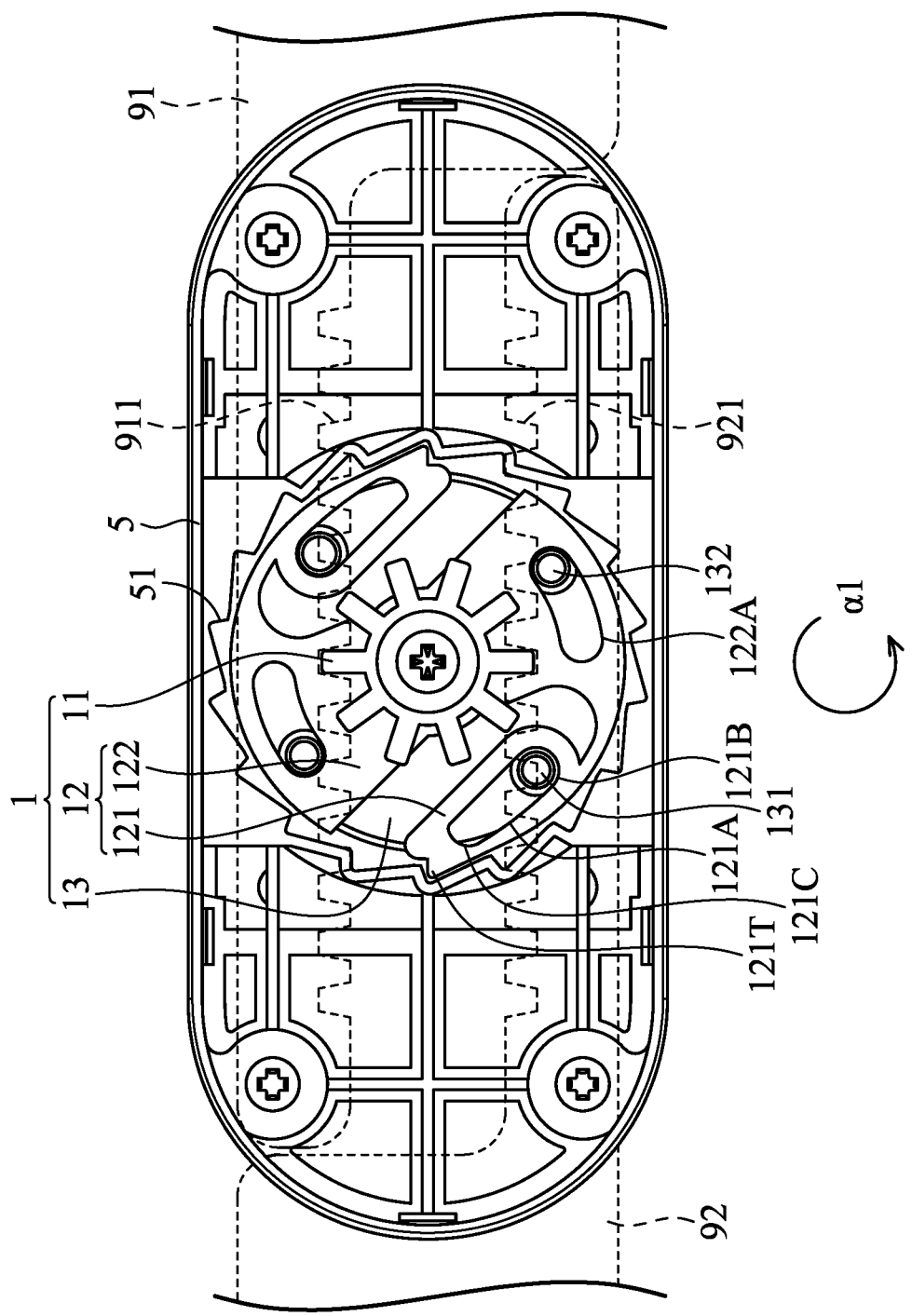
FIGS. 3A and 3B are assembled views of the horizontal adjustment unit of the embodiment of the invention.
Figure 3B:
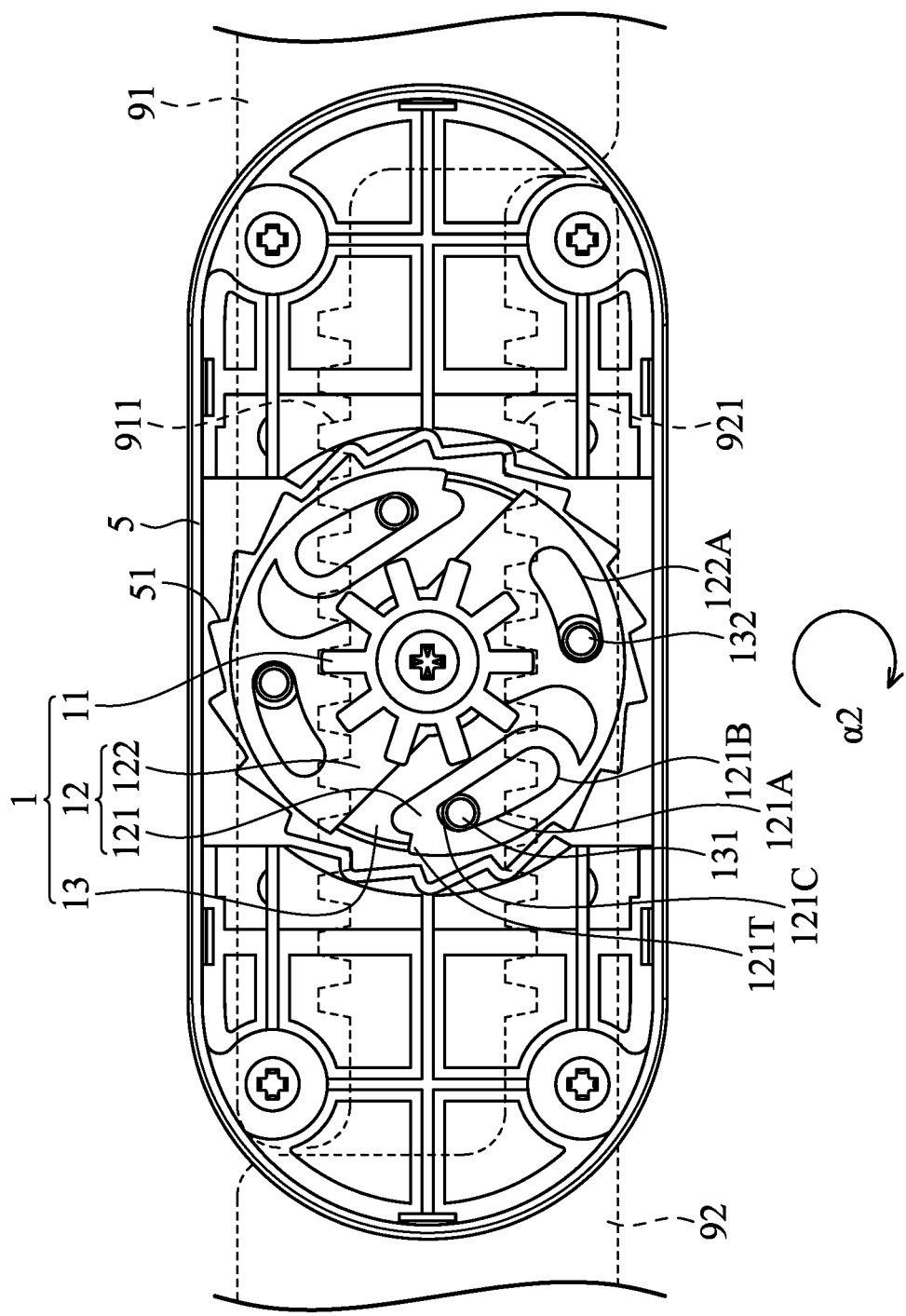

FIGS. 3A and 3B are assembled views of the horizontal adjustment unit of the embodiment of the invention. With reference to FIGS. 2, 3A and 3B, in one embodiment, the horizontal adjustment unit 1 comprises a first gear 11, a first restriction wheel 12 and a transmission member 13. The transmission member 13 is connected to the knob unit 3. The transmission member 13 is connected to the first restriction wheel 12. The first gear 11 is affixed to the first restriction wheel 12. The first horizontal headband 91 comprises a first rack 911. The second horizontal headband 92 comprises a second rack 921. The first gear 11 meshes with the first rack 911 and the second rack 921. The bracket 5 comprises a ratchet ring 51. The first restriction wheel 12 is adapted to be connected to the ratchet ring 51.

In this embodiment, the first gear 11 is integrally formed with the first restriction wheel 12. However, the disclosure is not meant to restrict the invention. The first gear 11 can also be wedged into the first restriction wheel 12, or connected to the first restriction wheel 12 in other ways. Additionally, the first horizontal headband 91 and the second horizontal headband 92 can also be parts of one headband.

With reference to FIGS. 3A and 3B, in one embodiment, the first restriction wheel 12 comprises a restriction wheel base 122 and a horizontal restriction member 121. The horizontal restriction member 121 is flexibly connected to the restriction wheel base 122. A first slot 121A is formed on the horizontal restriction member 121. A second slot 122A is formed on the restriction wheel base 122. The transmission member 13 comprises a first post 131 and a second post 132. The first post 131 is connected to the first slot 121A. The second post 132 is connected to the second slot 122A. The horizontal restriction member 121 is adapted to be wedged into the ratchet ring 51.

With reference to FIGS. 3A and 3B, in one embodiment, the horizontal restriction member 121 comprises a restriction ratchet 121T. The first slot 121A comprises a first slot end 121B and a second slot end 121C. When the first post 131 is in the first slot end 121B (FIG. 3A), the restriction ratchet 121T is wedged into the ratchet ring 51. When the first post 131 is in the second slot end 121C, the restriction ratchet 121T becomes separated from the ratchet ring 51 (FIG. 3B).

With reference to FIGS. 3A and 3B, in this embodiment, the user can rotate the first gear 11 in a first direction α1 to tighten the first horizontal headband 91 and the second horizontal headband 92. The user can also rotate the first gear 11 in a second direction α2 to loosen the first horizontal headband 91 and the second horizontal headband 92. The restriction ratchet 121T is wedged into the ratchet ring 51 to prevent the first horizontal headband 91 and the second horizontal headband 92 from coming loose.

Figure 4:
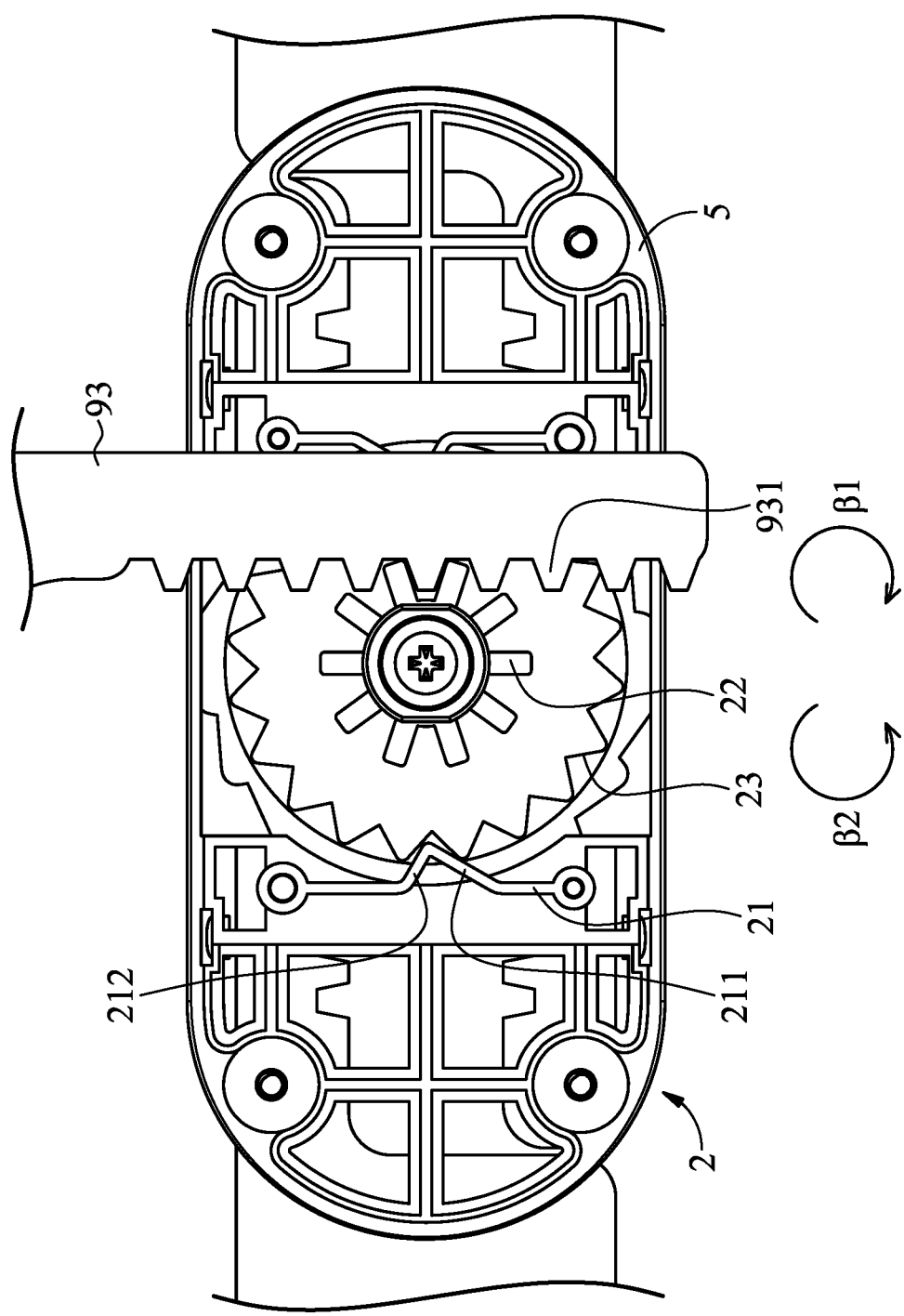
FIG. 4 is an assembled view of the longitudinal adjustment unit of the embodiment of the invention.

FIG. 4 is an assembled view of the longitudinal adjustment unit of the embodiment of the invention. With reference to FIG. 4, in one embodiment, the longitudinal adjustment unit 2 comprises a longitudinal restriction member 21, a second gear 22 and a second restriction wheel 23. The longitudinal restriction member 21 is disposed on the bracket 5. The second gear 22 is affixed to the second restriction wheel 23. The longitudinal headband 93 comprises a third rack 931. The second gear 22 meshes with the third rack 931. The longitudinal restriction member 21 restricts the second restriction wheel 23.

With reference to FIG. 4, in this embodiment, the user can rotate the second gear 22 in a third direction β1 to tighten the longitudinal headband 93. The user can also rotate the second gear 22 in a fourth direction β2 to loosen the longitudinal headband 93.

With reference to FIG. 4, in this embodiment, the second restriction wheel 23 can be a gear. The longitudinal restriction member 21 can be an elastic sheet. The longitudinal restriction member 21 includes a first elastic sheet abutting portion 211 and a second elastic sheet abutting portion 212. The slop of the first elastic sheet abutting portion 211 differs from the slop of the second first elastic sheet abutting portion 212 to improve the restriction ability.

With reference to FIG. 2 in one embodiment, the knob unit 3 comprises a horizontal adjustment knob 31 and a longitudinal adjustment knob 32. The horizontal adjustment knob 31 is connected to the horizontal adjustment unit 1. The position of the first horizontal headband 91 relative to the second horizontal headband 92 can be modified by rotating the horizontal adjustment knob 31. The longitudinal adjustment knob 32 is connected to the longitudinal adjustment unit 2. The position of the longitudinal headband 93 relative to the longitudinal adjustment unit 2 can be modified by rotating the longitudinal adjustment knob 32. The rotation axis of the horizontal adjustment knob 31 is collinear with the rotation axis of the longitudinal adjustment knob 32.

Figure 5A:
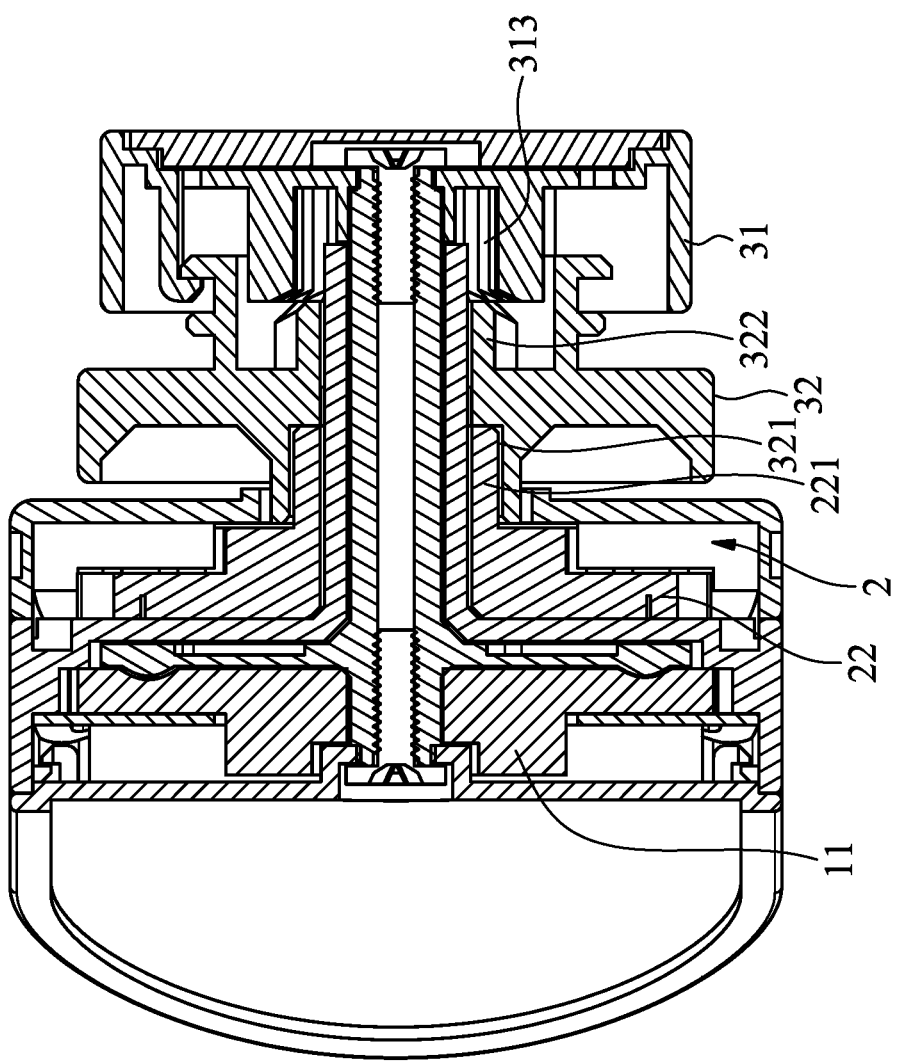
FIGS. 5A and 5B are cross sectional views of the headband adjustment mechanism of the first embodiment of the invention.
Figure 5B:
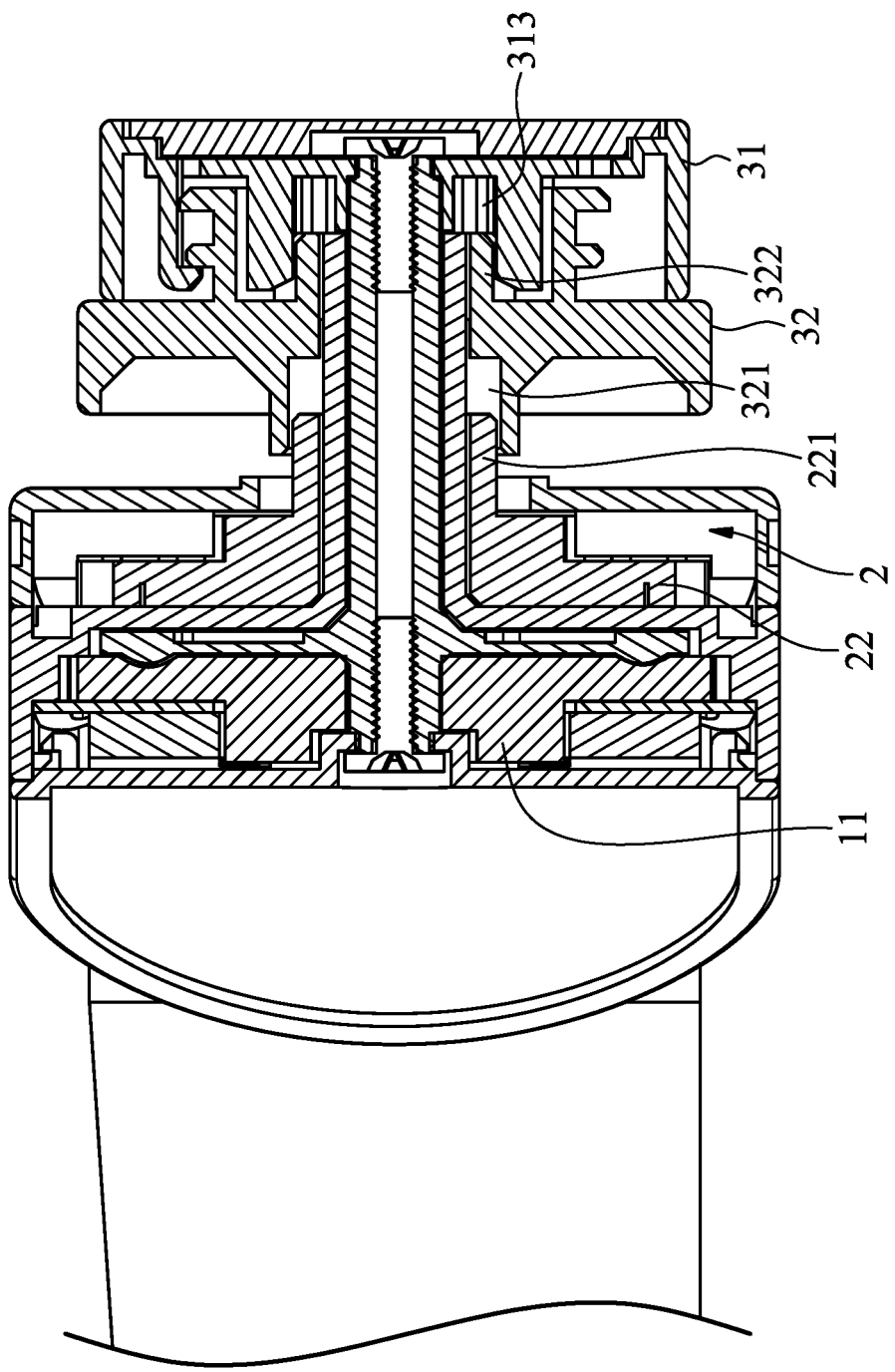

FIGS. 5A and 5B are cross sectional views of the headband adjustment mechanism of the first embodiment of the invention. With reference to FIG. 5A, in one embodiment, the second gear 22 comprises a gear wedging portion 221. The longitudinal adjustment knob 32 comprises a first knob wedging portion 321. The first knob wedging portion 321 is wedged into the gear wedging portion 221. With reference to FIGS. 2, 5A and 5B, in one embodiment, the longitudinal adjustment knob 32 is disposed between the longitudinal adjustment unit 2 and the horizontal adjustment knob 31. The longitudinal adjustment knob 32 comprises a second knob wedging portion 322. The horizontal adjustment knob 31 comprises a third knob wedging portion 313. With reference to FIG. 5A, in the first configuration, the second knob wedging portion 322 becomes separated from the third knob wedging portion 313, the horizontal adjustment knob 31 is adapted to rotate the first gear 11 independently, and the longitudinal adjustment knob 32 is adapted to rotate the second gear 22 independently. With reference to FIG. 5B, in the second configuration, the second knob wedging portion 322 is wedged into the third knob wedging portion 313, and the horizontal adjustment knob 31 and the longitudinal adjustment knob 32 rotate the first gear 11 and the second gear 22 simultaneously.

Figure 6:
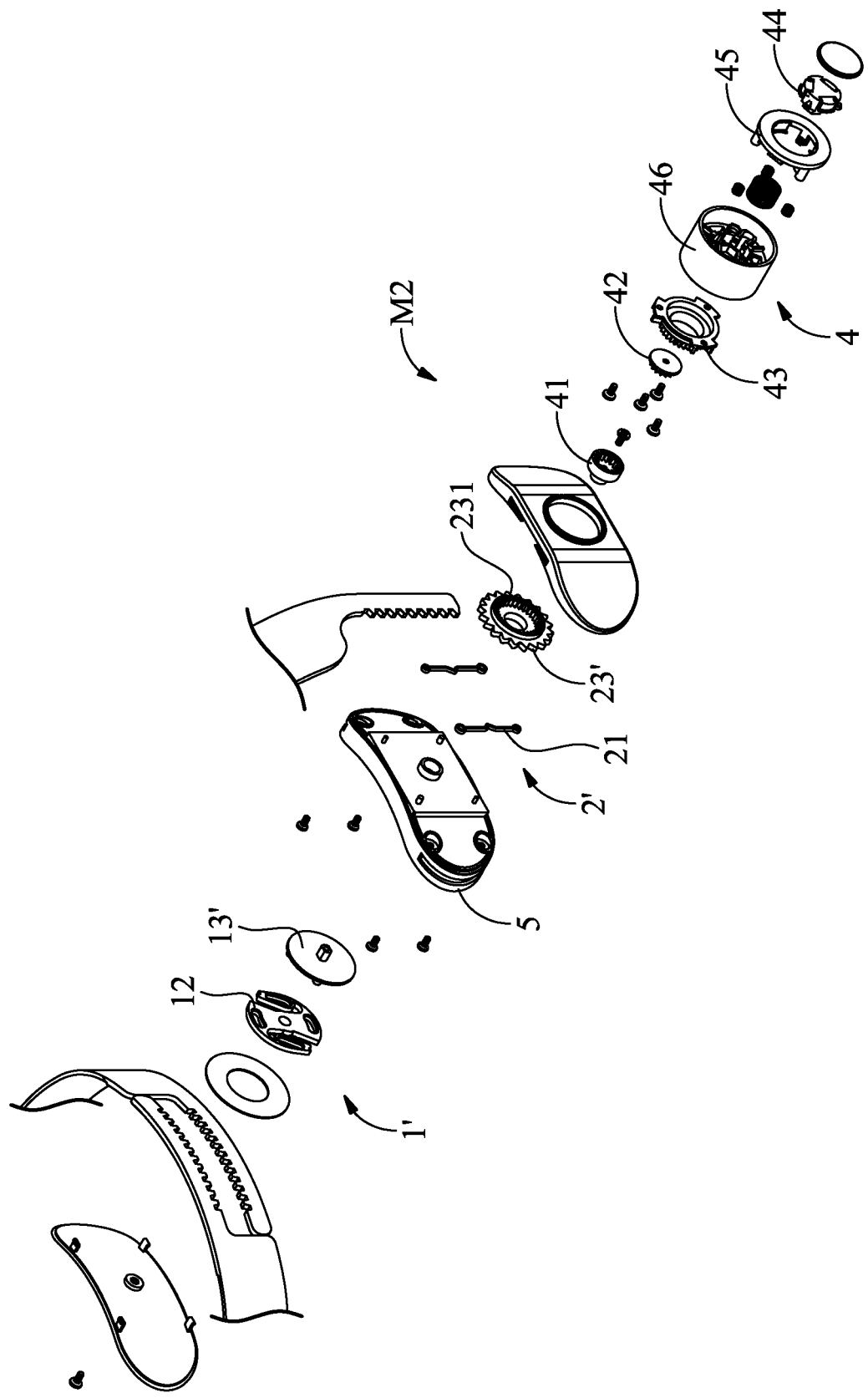
FIG. 6 is an exploded view of the headband adjustment mechanism of the second embodiment of the invention.
Figure 7A:
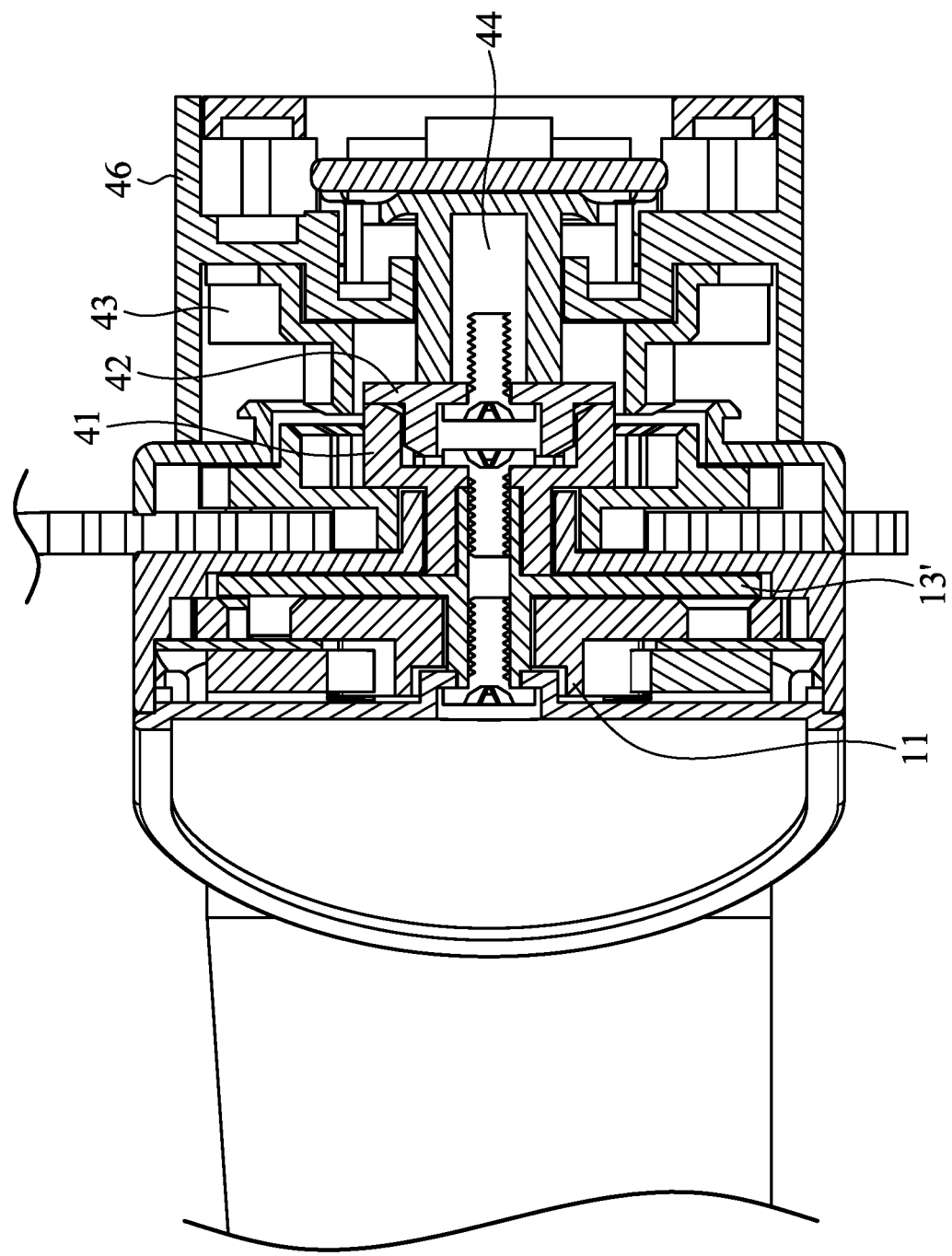
FIGS. 7A and 7B are sectional views of the headband adjustment mechanism of the second embodiment of the invention.
Figure 7B:
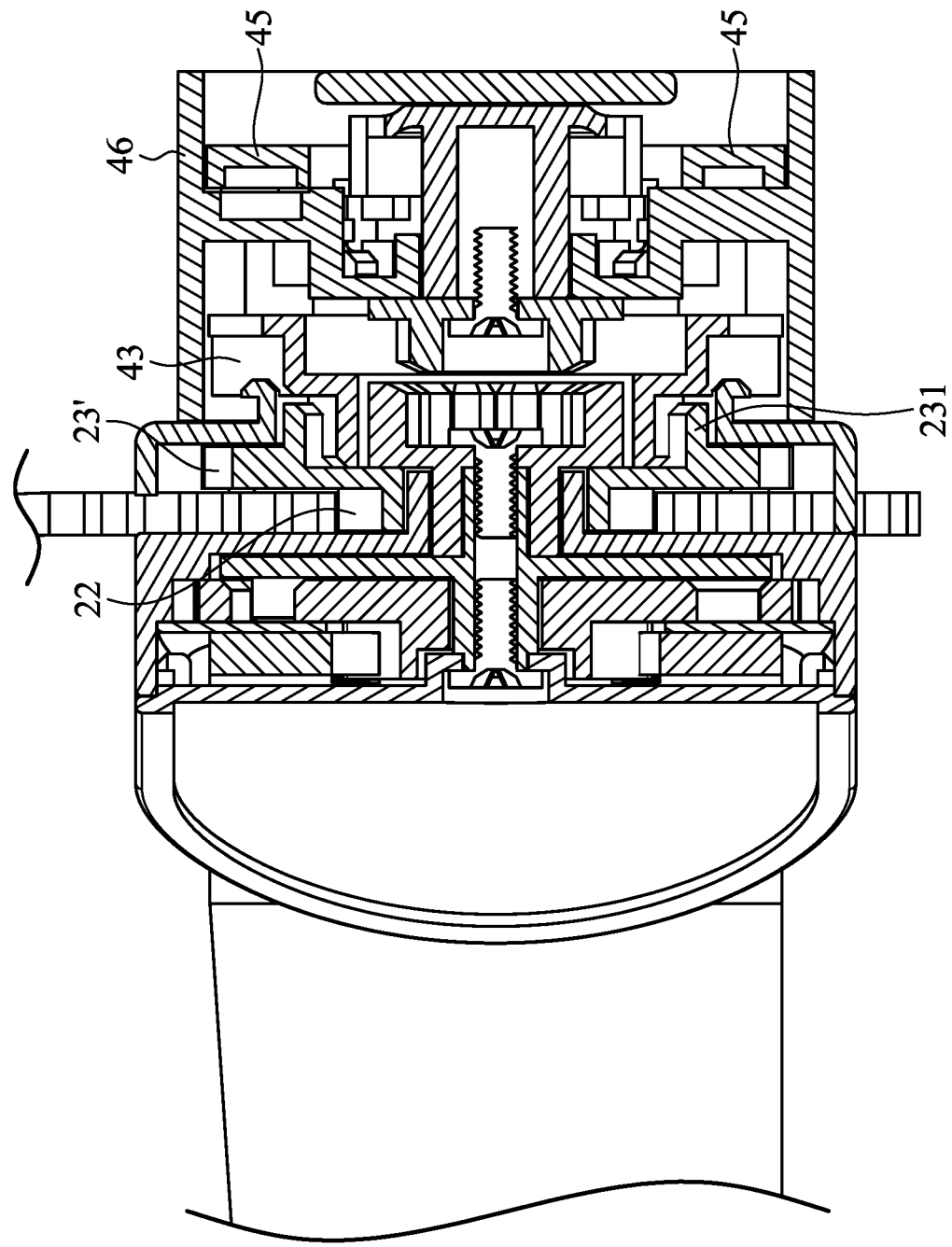
Figure 8A:
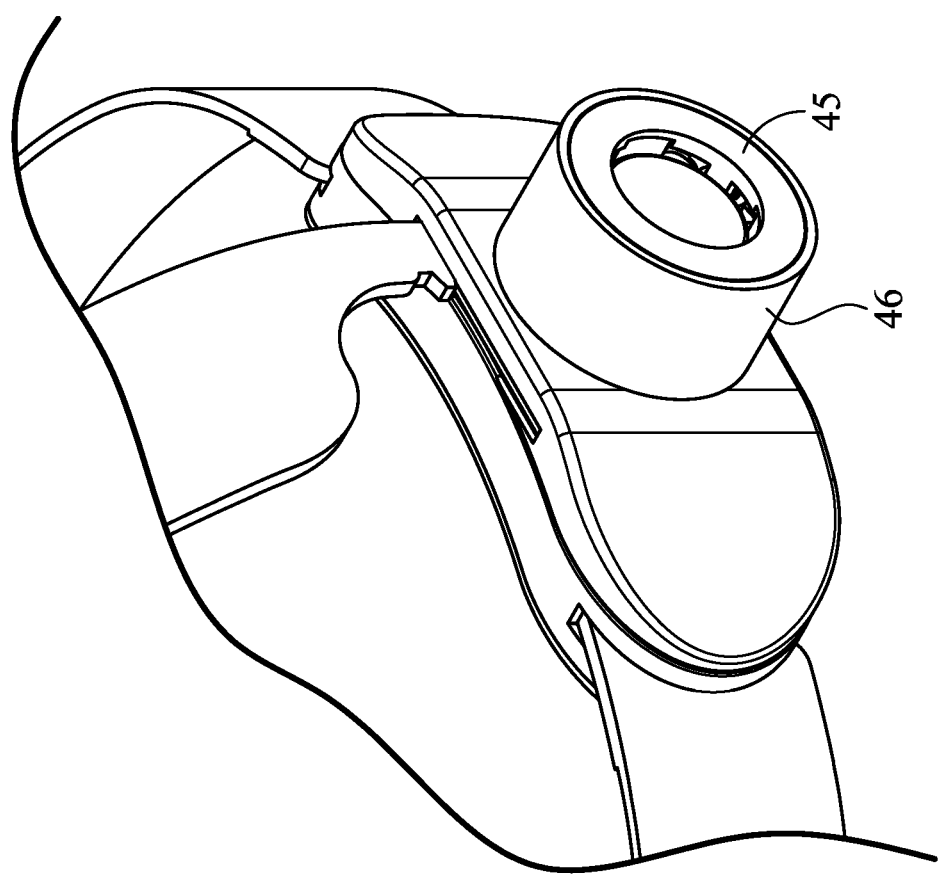
FIGS. 8A and 8B are perspective views of the headband adjustment mechanism of the second embodiment of the invention.
Figure 8B:
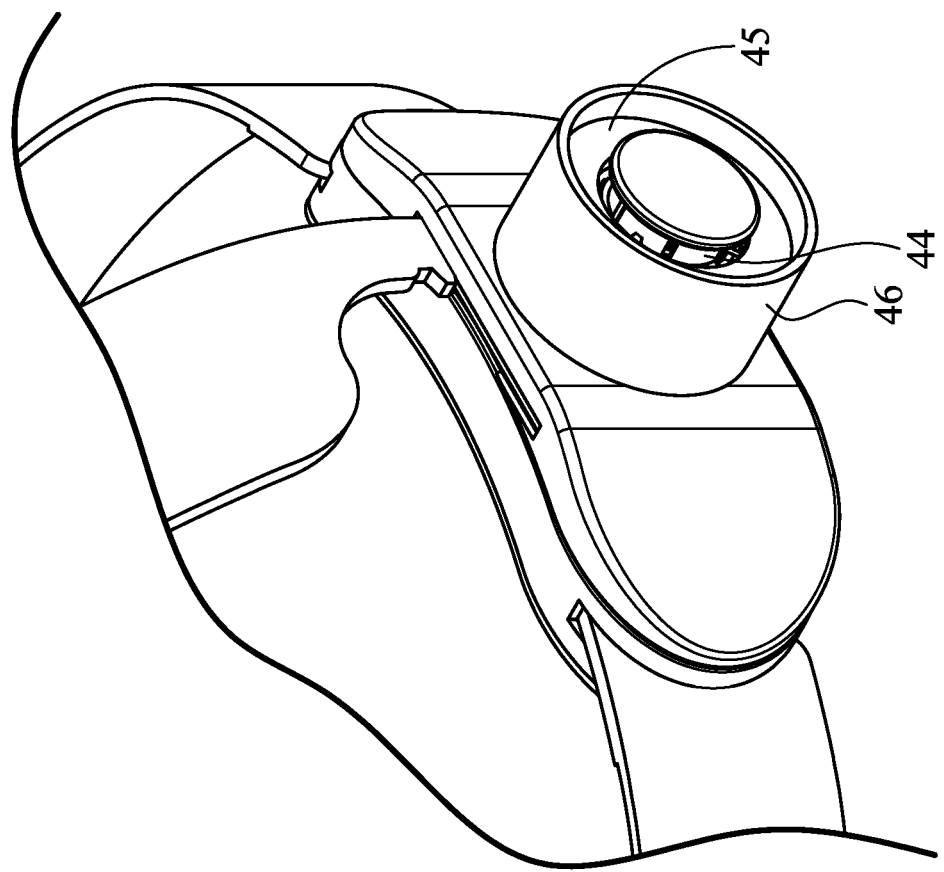

FIG. 6 is an exploded view of the headband adjustment mechanism M2 of the second embodiment of the invention. FIGS. 7A and 7B are sectional views of the headband adjustment mechanism M2 of the second embodiment of the invention. FIGS. 8A and 8B are perspective views of the headband adjustment mechanism M2 of the second embodiment of the invention. With reference to FIGS. 6, 7A, 7B, 8A and 8B, the headband adjustment mechanism M2 comprises a horizontal adjustment unit 1', a longitudinal adjustment unit 2' and a knob unit 4. In this embodiment, the second restriction wheel 23' comprises a restriction wheel wedging portion 231. The knob unit 4 comprises a first clutch member 41, a second clutch member 42, a wedging ring 43, an inner button 44, an outer button 45 and a major knob 46. The first clutch member 41 is affixed to the transmission member 13'. The second clutch member 42 is affixed to the inner button 44. The outer button 45 is affixed to the wedging ring 43. In the first configuration (FIGS. 7A and 8A), the major knob 46 is connected to the inner button 44, the second clutch member 42 is connected to the first clutch member 41 to rotate the first gear 11. In the second configuration (FIGS. 7B and 8B), the major knob 46 is connected to the outer button 45, and the wedging ring 43 is connected to the restriction wheel wedging portion 231 and rotates the second gear 22.

Figure 9A:
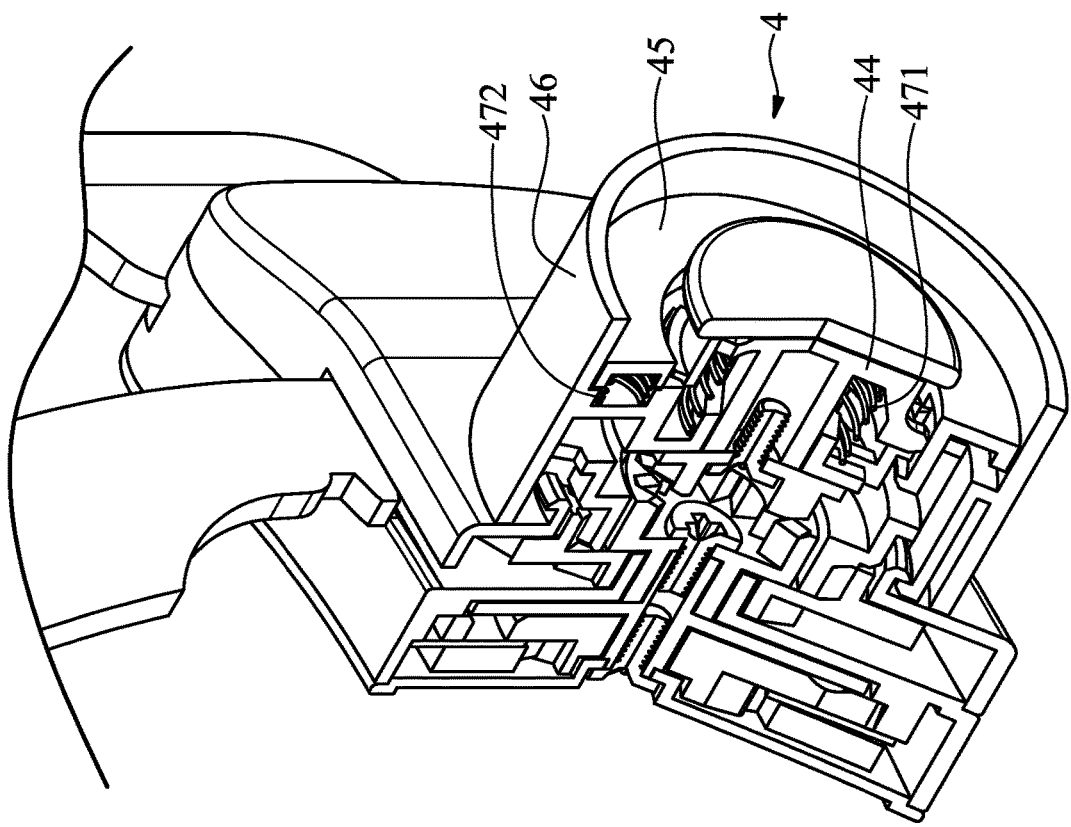
FIGS. 9A and 9B show details of the knob unit of the second embodiment of the invention.
Figure 9B:
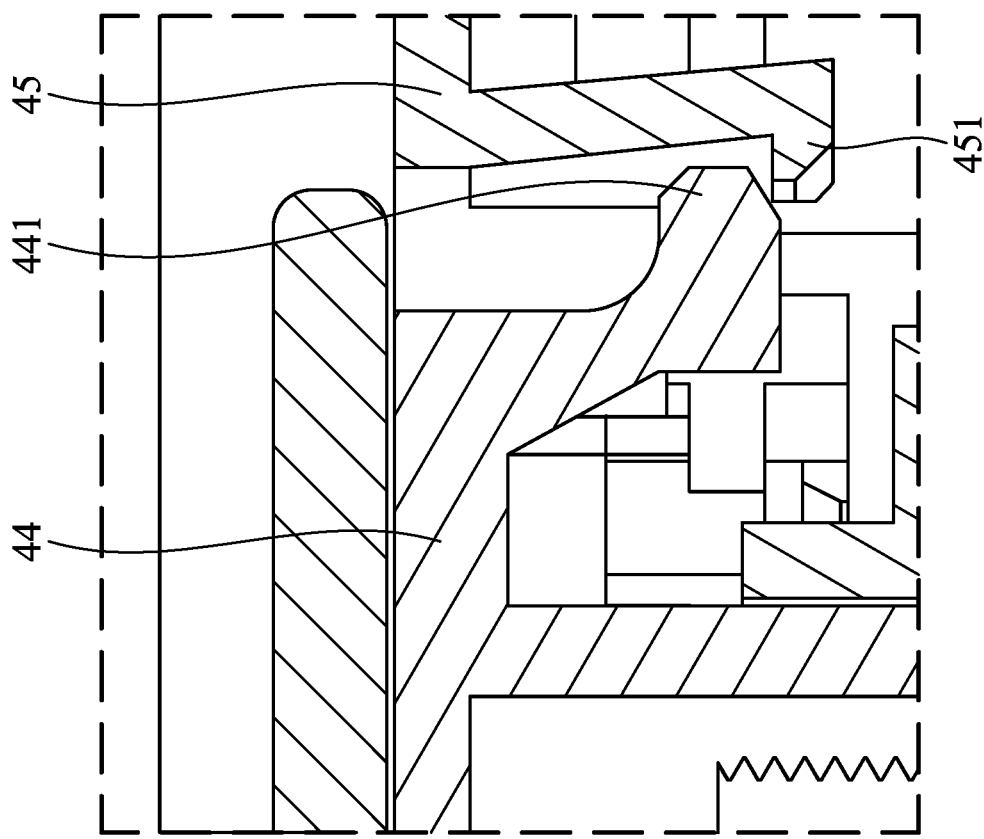

FIGS. 9A and 9B show details of the knob unit of the second embodiment of the invention. With reference to FIGS. 6, 7A, 7B, 9A and 9B, in this embodiment, the knob unit 4 comprises an inner spring 471 and an outer spring 472. One end of the inner spring 471 abuts the major knob 46. The other end of the inner spring 471 abuts the inner button 44. One end of the outer spring 472 abuts the major knob 46. The other end of the outer spring 472 abuts the outer button 45. The inner button 44 comprises an inner button hook 441. The outer button 45 comprises an outer button hook 451. When the knob unit 4 is switched from the second configuration to the first configuration, the inner button hook 441 pushes the outer button hook 451, and the outer spring 472 moves the outer button 45. When the knob unit 4 is switched from the first configuration to the second configuration, the outer button hook 451 pushes the inner button hook 441, and the inner spring 471 moves the inner button 44. Therefore, the headband adjustment mechanism can be switched between the first configuration and the second configuration by pressing the inner button 44 or the outer button 45.

Figure 10:
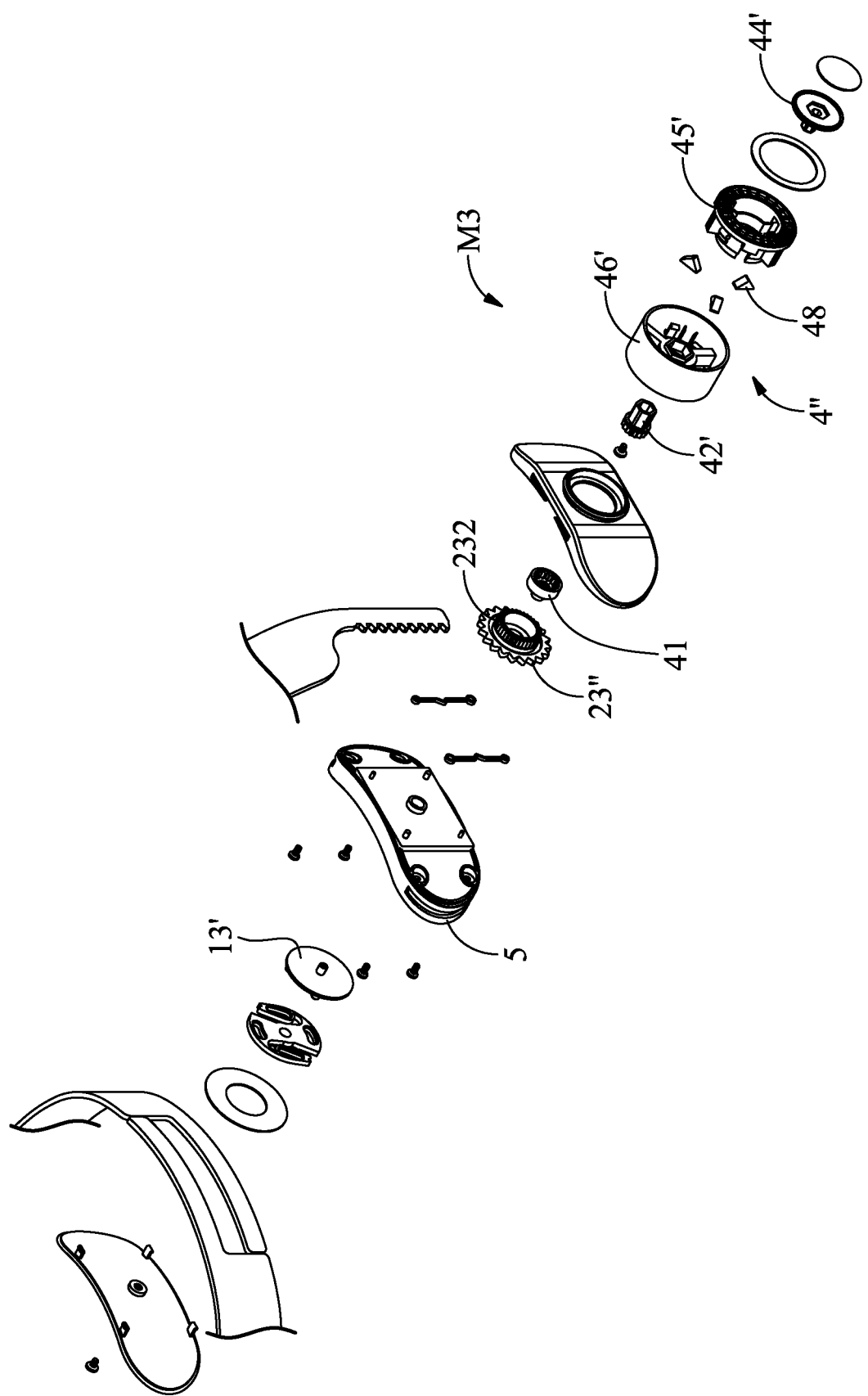
FIG. 10 is an exploded view of the headband adjustment mechanism of the third embodiment of the invention.
Figure 11A:
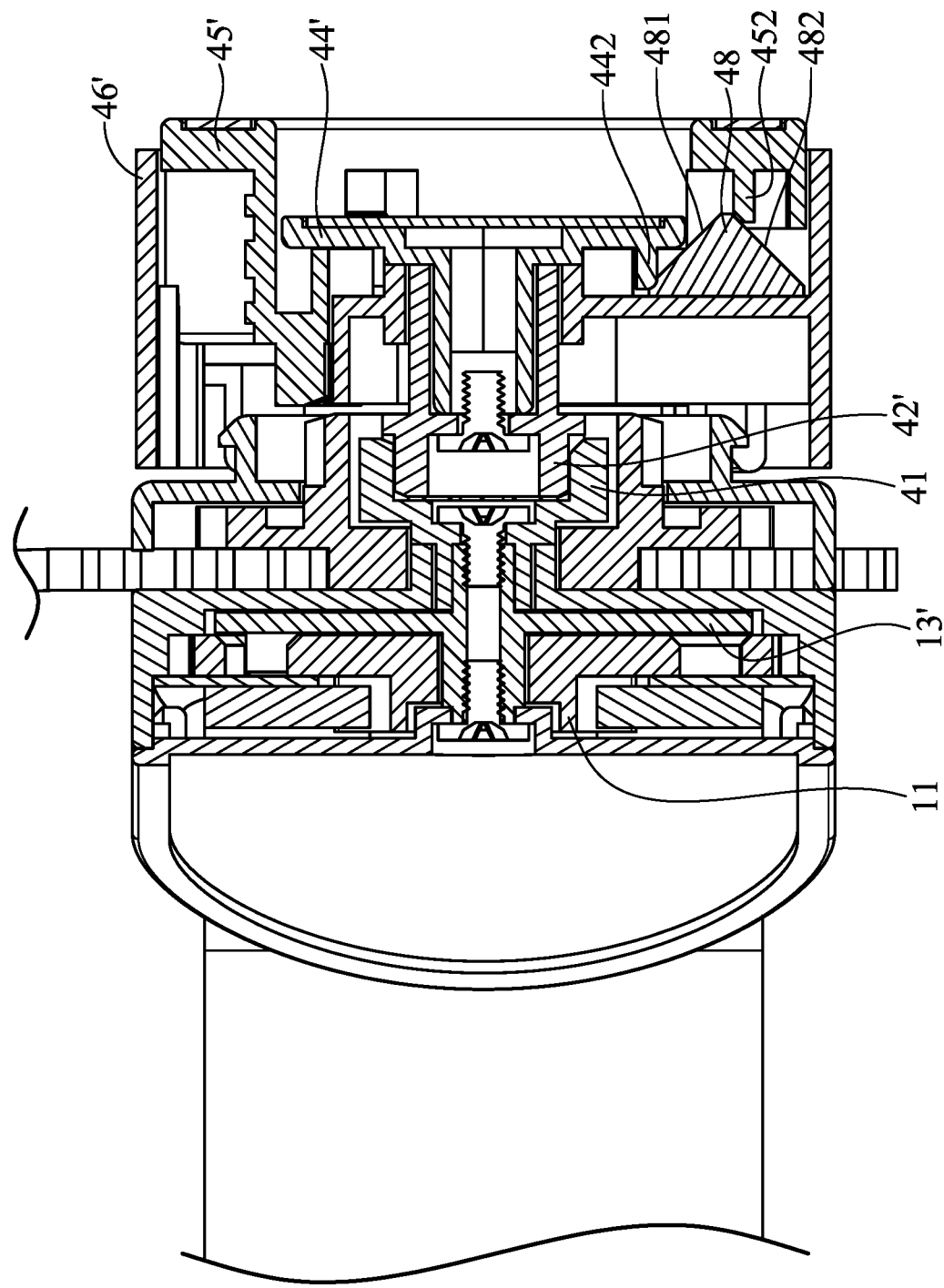
FIGS. 11A and 11B are sectional views of the headband adjustment mechanism of the third embodiment of the invention.
Figure 11B:
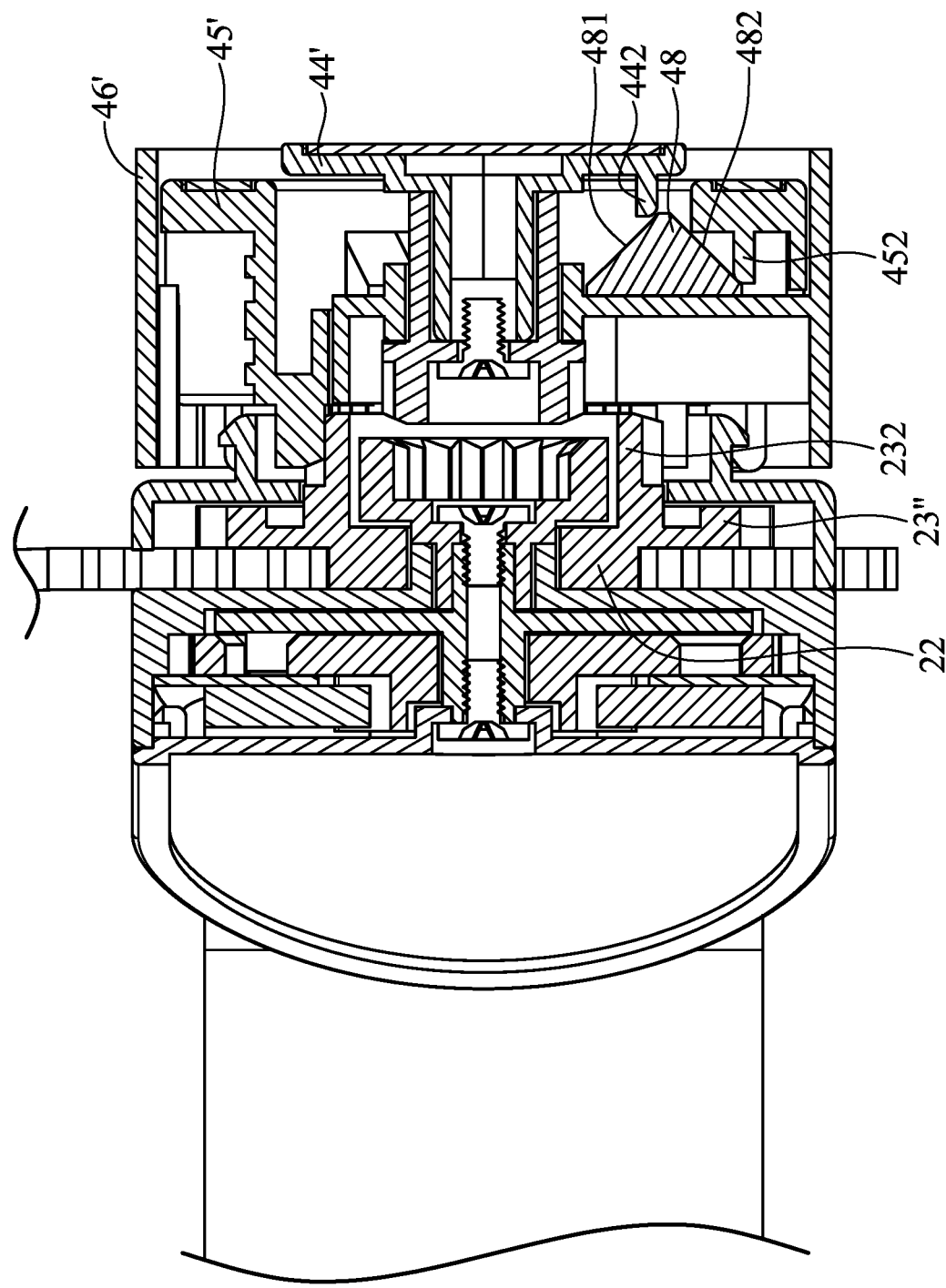

FIG. 10 is an exploded view of the headband adjustment mechanism M3 of the third embodiment of the invention. FIGS. 11A and 11B are sectional views of the headband adjustment mechanism M3 of the third embodiment of the invention. With reference to FIGS. 10, 11A and 11B, in this embodiment, the second restriction wheel 23" comprises a restriction wheel wedging portion 232. The knob unit comprises a first clutch member 41, a second clutch member 42', an inner button 44', an outer button 45' and a major knob 46'. The first clutch member 41 is affixed to the transmission member 13'. The second clutch member 42' is affixed to the inner button 44'. In the first configuration (FIG. 11A), the major knob 46' is connected to the inner button 44', the second clutch member 42' is connected to the first clutch member 41 to rotate the first gear 11. In the second configuration (FIG. 11B), the major knob 46' is connected to the outer button 45', and the outer button 45' is connected to the restriction wheel wedging portion 232 and rotates the second gear 22.

Figure 12A:
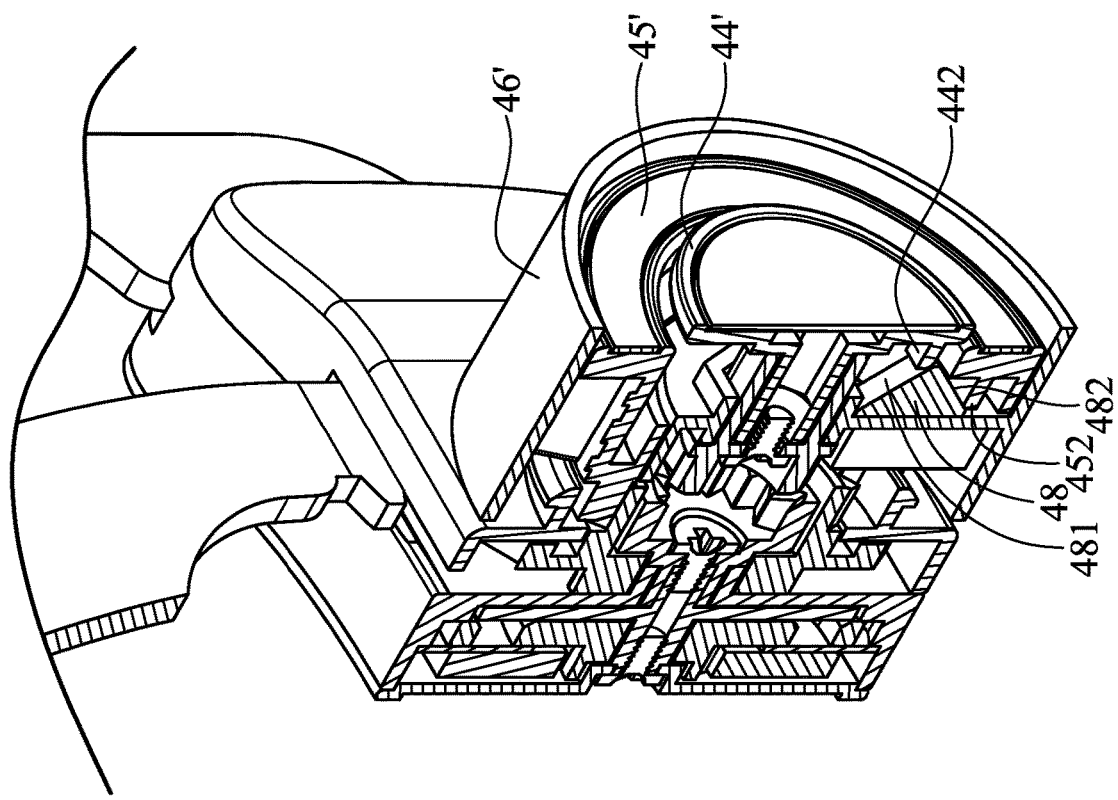
FIGS. 12A and 12B show details of the knob unit of the third embodiment of the invention.
Figure 12B:
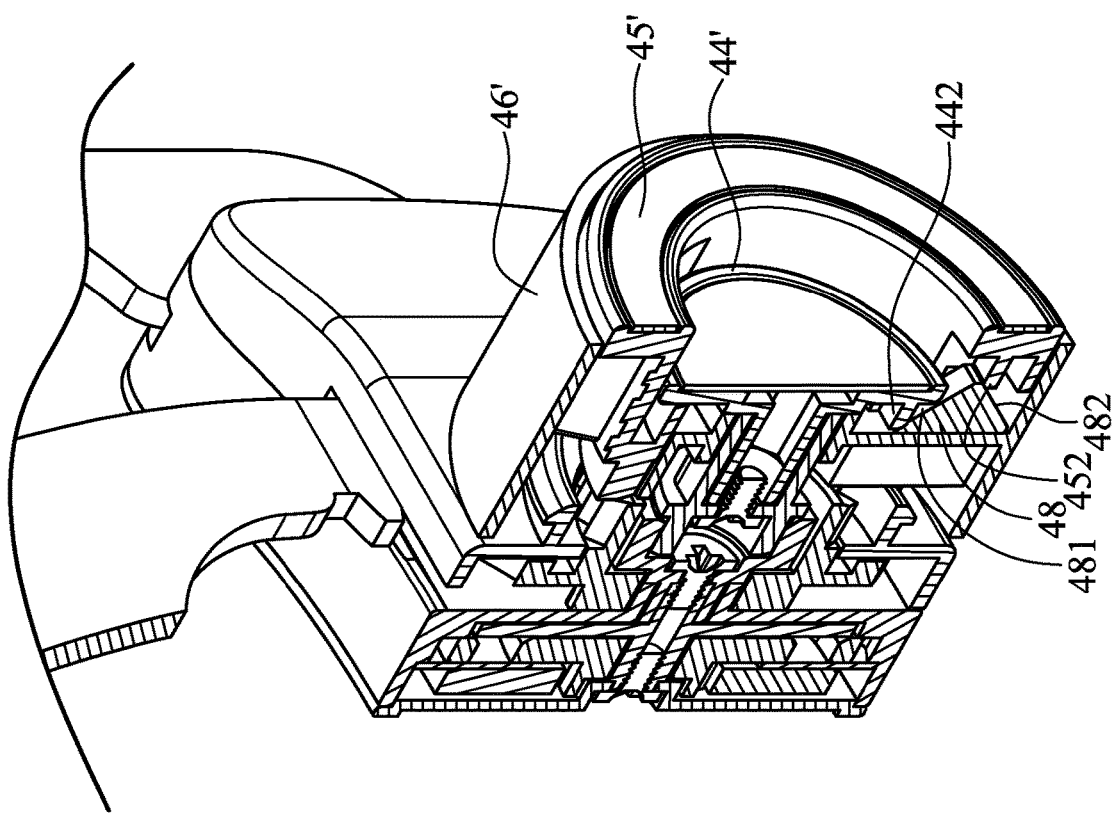

FIGS. 12A and 12B show details of the knob unit of the third embodiment of the invention. With reference to FIGS. 10, 11A, 11B, 12A and 12B, in one embodiment, the knob unit 4" comprises a slider 48. The slider 48 comprises a first slider-inclined surface 481 and a second slider-inclined surface 482. The inner button 44' comprises an inner button abutting portion 442. The outer button 45' comprises an outer button abutting portion 452. When the knob unit 4" is switched from the second configuration to the first configuration, the inner button abutting portion 442 pushes the first slider-inclined surface 481 to move the slider 48, and the second slider-inclined surface 482 pushes the outer button abutting portion 452 to move the outer button 45'. When the knob unit 4" is switched from the first configuration to the second configuration, the outer button abutting portion 452 pushes the second slider-inclined surface 482 to move the slider 48, and the first slider-inclined surface 481 pushes the inner button abutting portion 442 to move the inner button 44'. Therefore, the headband adjustment mechanism can be switched between the first configuration and the second configuration by pressing the inner button 44' or the outer button 45'.

In the embodiment of the invention, the tightness of the first horizontal headband, the second horizontal headband and the longitudinal headband can be adjusted by the knob unit with only one rotation axis. The user can adjust the tightness of the headbands easily. Additionally, in the embodiment of the invention, the tightness of the first horizontal headband, the second horizontal headband and the longitudinal headband can be adjusted simultaneously, and it is convenient to user for adjusting the tightness of the headbands.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:
1. A head-mounted device, comprising:
a longitudinal headband;
a horizontal headband unit;

a knob unit, wherein in a first configuration, the knob unit is adapted to adjust a tightness of the horizontal headband unit and a tightness of the longitudinal headband independently, wherein in a second configuration, the knob unit is adapted to adjust both the tightness of the horizontal headband unit and the tightness of the longitudinal headband simultaneously;

a horizontal adjustment unit; and a longitudinal adjustment unit, wherein the horizontal headband unit comprises a first horizontal headband and a second horizontal headband, the horizontal adjustment unit is connected to the first horizontal headband and the second horizontal headband, the longitudinal adjustment unit is connected to the longitudinal headband, wherein the knob unit is selectively connected to the horizontal adjustment unit and the longitudinal adjustment unit, or is connected to the horizontal adjustment unit and the longitudinal adjustment unit simultaneously, wherein a position of the first horizontal headband relative to the second horizontal headband and a position of the longitudinal headband relative to the longitudinal adjustment unit can be modified using the knob unit, wherein the knob unit has only one rotation axis.

2. The head-mounted device as claimed in claim 1, further comprising a bracket, wherein at least a portion of the horizontal adjustment unit is disposed on one side of the bracket, and the longitudinal adjustment unit is disposed on the other side of the bracket.

3. The head-mounted device as claimed in claim 2, wherein the horizontal adjustment unit comprises a first gear, a first restriction wheel, and a transmission member, the transmission member is connected to the knob unit, the transmission member is connected to the first restriction wheel, the first gear is affixed to the first restriction wheel, the first horizontal headband comprises a first rack, the second horizontal headband comprises a second rack, the first gear meshes with the first rack and the second rack, the bracket comprises a ratchet ring, and the first restriction wheel is adapted to be connected to the ratchet ring.

4. The head-mounted device as claimed in claim 3, wherein the first restriction wheel comprises a restriction wheel base and a horizontal restriction member, the horizontal restriction member is flexibly connected to the restriction wheel base, a first slot is formed on the horizontal restriction member, a second slot is formed on the restriction wheel base, the transmission member comprises a first post and a second post, the first post is connected to the first slot, the second post is connected to the second slot, and the horizontal restriction member is adapted to be wedged into the ratchet ring.

5. The head-mounted device as claimed in claim 4, wherein the horizontal restriction member comprises a restriction ratchet, the first slot comprises a first slot end and a second slot end, and when the first post is in the first slot end, the restriction ratchet is wedged into the ratchet ring, and when the first post is in the second slot end, the restriction ratchet becomes separated from the ratchet ring.

6. The head-mounted device as claimed in claim 3, wherein the longitudinal adjustment unit comprises a longitudinal restriction member, a second gear, and a second restriction wheel, the longitudinal restriction member is disposed on the bracket, the second gear is affixed to the second restriction wheel, the longitudinal headband comprises a third rack, the second gear meshes with the third rack, and the longitudinal restriction member restricts the second restriction wheel.

7. The head-mounted device as claimed in claim 6, wherein the knob unit comprises a horizontal adjustment knob and a longitudinal adjustment knob, the horizontal adjustment knob is connected to the horizontal adjustment unit, the position of the first horizontal headband relative to the second horizontal headband is modified by rotating the horizontal adjustment knob, the longitudinal adjustment knob is connected to the longitudinal adjustment unit, the position of the longitudinal headband relative to the longitudinal adjustment unit is modified by rotating the longitudinal adjustment knob, and a rotation axis of the horizontal adjustment knob is collinear with a rotation axis of the longitudinal adjustment knob.

8. The head-mounted device as claimed in claim 7, wherein the second gear comprises a gear wedging portion, the longitudinal adjustment knob comprises a first knob wedging portion, and the first knob wedging portion is wedged into the gear wedging portion.

9. The head-mounted device as claimed in claim 8, wherein the longitudinal adjustment knob is disposed between the longitudinal adjustment unit and the horizontal adjustment knob, the longitudinal adjustment knob comprises a second knob wedging portion, the horizontal adjustment knob comprises a third knob wedging portion, wherein in the first configuration, the second knob wedging portion becomes separated from the third knob wedging portion, the horizontal adjustment knob is adapted to rotate the first gear independently, and the longitudinal adjustment knob is adapted to rotate the second gear independently, wherein in the second configuration, the second knob wedging portion is wedged into the third knob wedging portion, and the horizontal adjustment knob and the longitudinal adjustment knob rotate the first gear and the second gear simultaneously.

10. The head-mounted device as claimed in claim 6, wherein the second restriction wheel comprises a restriction wheel wedging portion, the knob unit comprises a first clutch member, a second clutch member, a wedging ring, an inner button, an outer button, and a major knob, the first clutch member is affixed to the transmission member, the second clutch member is affixed to the inner button, the outer button is affixed to the wedging ring, wherein in the first configuration, the major knob is connected to the inner button, the second clutch member is connected to the first clutch member to rotate the first gear, wherein in the second configuration, the major knob is connected to the outer button, and the wedging ring is connected to the restriction wheel wedging portion and rotates the second gear.

11. The head-mounted device as claimed in claim 10, wherein the knob unit comprises an inner spring and an outer spring, one end of the inner spring abuts the major knob, the other end of the inner spring abuts the inner button, one end of the outer spring abuts the major knob, the other end of the outer spring abuts the outer button, the inner button comprises an inner button hook, the outer button comprises an outer button hook, and when the knob unit is switched from the second configuration to the first configuration, the inner button hook pushes the outer button hook, and the outer spring moves the outer button, and when the knob unit is switched from the first configuration to the second configuration, the outer button hook pushes the inner button hook, and the inner spring moves the inner button.

12. The head-mounted device as claimed in claim 6, wherein the second restriction wheel comprises a restriction wheel wedging portion, the knob unit comprises a first clutch member, a second clutch member, an inner button, an outer button, and a major knob, the first clutch member is affixed to the transmission member, the second clutch member is affixed to the inner button, wherein in the first configuration, the major knob is connected to the inner button, the second clutch member is connected to the first clutch member to rotate the first gear, wherein in the second configuration, the major knob is connected to the outer button, and the outer button is connected to the restriction wheel wedging portion and rotates the second gear.

13. The head-mounted device as claimed in claim 12, wherein the knob unit comprises a slider, the slider comprises a first slider-inclined surface and a second slider-inclined surface, the inner button comprises an inner button abutting portion, the outer button comprises an outer button abutting portion, and when the knob unit is switched from the second configuration to the first configuration, the inner button abutting portion pushes the first slider-inclined surface to move the slider, and the second slider-inclined surface pushes the outer button abutting portion to move the outer button, and when the knob unit is switched from the first configuration to the second configuration, the outer button abutting portion pushes the second slider-inclined surface to move the slider, and the first slider-inclined surface pushes the inner button abutting portion to move the inner button.

14. A head-mounted device, comprising:
a first horizontal headband;
a second horizontal headband;
a longitudinal headband; and
a headband adjustment mechanism, comprising:
a horizontal adjustment unit, connected to the first horizontal headband and the second horizontal headband;
a longitudinal adjustment unit, connected to the longitudinal headband; and
a knob unit, selectively connected to the horizontal adjustment unit and the longitudinal adjustment unit, or connected to the horizontal adjustment unit and the longitudinal adjustment unit simultaneously, wherein the position of the first horizontal headband relative to the second horizontal headband and the position of the longitudinal headband relative to the longitudinal adjustment unit can be modified using the knob unit, and the knob unit has only one rotation axis,
wherein in a first configuration, the knob unit is adapted to adjust a tightness of the horizontal headband unit and a tightness of the longitudinal headband independently;
wherein in a second configuration, the knob unit is adapted to adjust both the tightness of the horizontal headband unit and the tightness of the longitudinal headband simultaneously.

* * * * *